Figure 1:
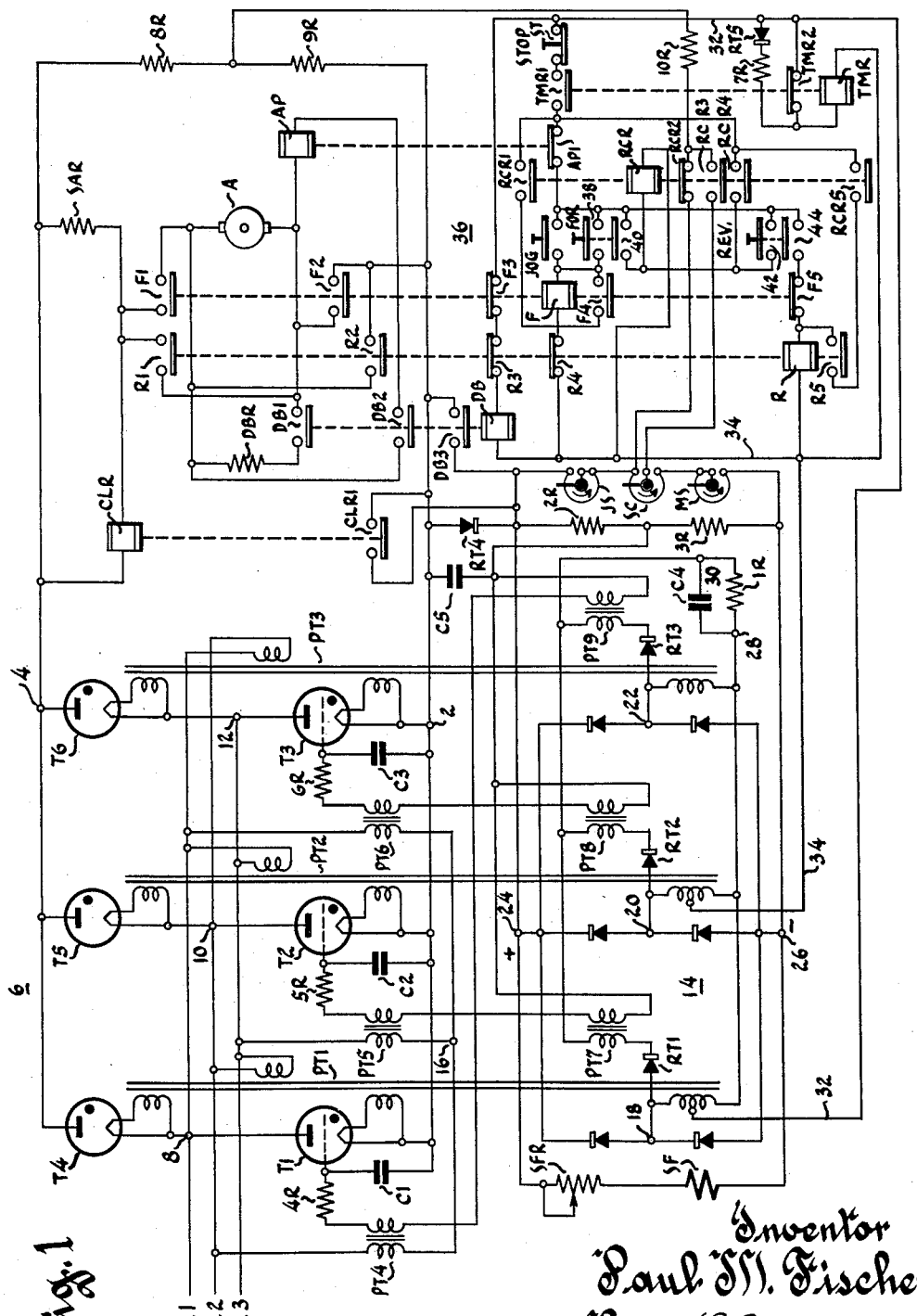

Feb. 16, 1960     P. M. FISCHER     2,925,545
MOTOR CONTROL SYSTEM
Filed Nov. 5, 1958     2 Sheets-Sheet 1

Inventor
Paul M. Fischer
By H R Rather
Attorney

Feb. 16, 1960    P. M. FISCHER    2,925,545
MOTOR CONTROL SYSTEM
Filed Nov. 5, 1958    2 Sheets-Sheet 2

Inventor
Paul M. Fischer
By H.R. Rather
Attorney

United States Patent Office 2,925,545
Patented Feb. 16, 1960

2,925,545
MOTOR CONTROL SYSTEM

Paul M. Fischer, Milwaukee, Wis., assignor to Cutler-Hammer, Inc., Milwaukee, Wis., a corporation of Delaware Application November 5, 1958, Serial No. 772,002

15 Claims. (Cl. 318—345)

This invention relates to control systems for transferring energy between alternating current and direct current networks.

While not limited thereto, the invention is especially applicable to systems for supplying and controlling power from a plural-phase alternating current power supply source to the armature and field windings of direct current motors.

Paul M. Fischer copending application Serial No. 685,599, filed September 23, 1957, and assigned to the assignee of the present invention, discloses systems of the aforementioned type. The present invention comprises improvements thereon.

A general object of the invention is to provide improved means for supplying and adjustably controlling power from an alternating current source to a direct current load.

A more specific object of the invention is to provide a rectifier network having a plurality of unidirectional current conducting devices connected between a plural-phase source and a direct current load with improved means for insuring that the unidirectional conducting devices commutate the load current in a predetermined sequence.

Another specific object of the inventions is to provide such network connected between a plural-phase source and an inductive direct current load with improved means for preventing uncontrolled conduction of the unidirectional conducting devices.

Another object of the invention is to provide a rectifier network comprising controllable electric discharge devices connected between a plural-phase source and a direct current motor with improved control means for supplying peaked control pulses to the controllable discharge devices to effect conduction therethrough in a predetermined repetitively sequential order.

Another object of the invention is to provide, in an electric discharge device type of rectifier network connected between a plural-phase alternating current source and a direct current load having phase-shifted alternating current grid control means, improved means for supplying peaked control pulses to the grids of the electric discharge devices to insure operation of the latter in a predetermined sequence.

Another object of the invention is to provide improved means for applying such peaked central pulse to the grid of each electric discharge device whenever the phase-shifted alternating current grid control means fails to render the same conducting in its predetermined sequence.

Another object of the invention is to provide such control means with apparatus for controlling the voltage level of the control pulse network relative to the cathode voltage of the controllable discharge devices.

Other objects and advantages of the invention will hereinafter appear.

While the apparatus hereinafter described is effectively adapted to fulfill the objects stated, it is to be understood that I do not intend to confine my invention to the particular preferred embodiments of control system disclosed, inasmuch as they are susceptible of various modifications without departing from the scope of the appended claims.

Figure 2:
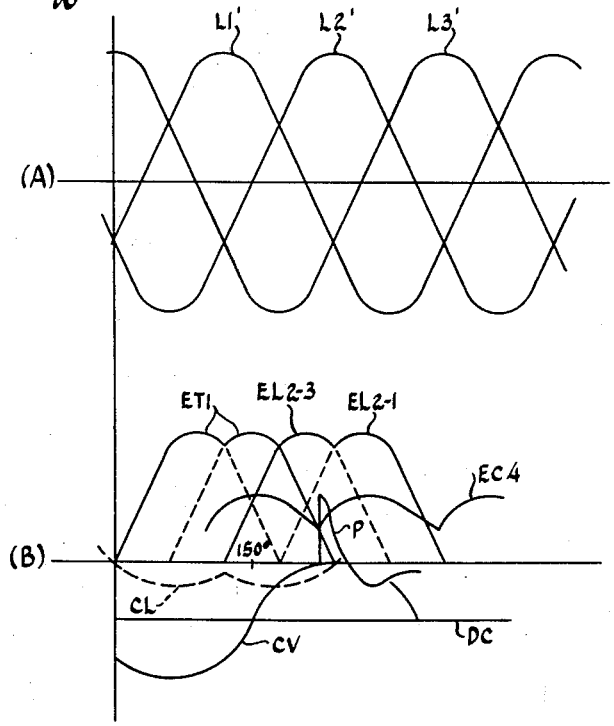
Figure 3:
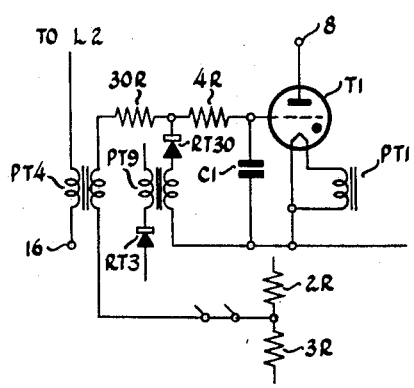

A system in accordance with the invention will now be described in detail with reference to the accompanying drawings, wherein:

Figure 1 diagrammatically shows a motor control system constructed in accordance with the invention;

Fig. 2 graphically depicts operating characteristics of the system of Fig. 1; and Fig. 3 diagrammatically shows a modification of the system of Fig. 1.

Referring to Fig. 1, there is shown a direct current motor of the shunt wound type having an armature A and a field winding SF. Armature A is connected for energization across output terminals 2 and 4 of a three-phase full-wave rectifier network indicated generally by 6, the latter having its input terminals 8, 10 and 12 connected through lines L1, L2 and L3, respectively, to a three-phase alternating current power supply source. Rectifier network 6 is provided with three controlled rectifiers T1, T2 and T3 shown as gas filled triodes of the thyratron type or the like and three uncontrolled rectifiers T4, T5 and T6 shown as gas filled diodes. Lines L1, L2 and L3 are connected through input terminals 8, 10 and 12 to the anodes of controlled rectifiers T1, T2 and T3, respectively, the cathodes of the latter being connected in parallel to output terminal 2. The anodes of uncontrolled rectifiers T4, T5 and T6 are connected in parallel to output terminal 4 and the cathodes thereof are connected to input terminals 8, 10 and 12, respectively.

Transformers PT1, PT2 and PT3, each having a primary winding and three secondary windings, are provided for supplying power from the respective phases of the power supply source for heating the cathodes of the controlled and uncontrolled rectifiers and for energizing a three-phase full-wave rectifier bridge 14 and a peaking circuit hereinafter described. The primary winding of transformer PT1 is connected across lines L2 and L3, the primary winding of transformer PT2 is connected across lines L3 and L1, and the primary winding of transformer PT3 is connected across lines L1 and L2. The upper and middle secondary windings of transformer PT1 are connected across the cathodes of rectifiers T4 and T1, respectively. The upper and middle seconary windings of transformer PT1 are connected across the cathodes of rectifiers T4 and T1, respectively. The upper and middle secondary windings of transformer PT2 are connected across the cathodes of rectifiers T5 and T2, respectively. And the upper and middle secondary windings of transformer PT3 are connected across the cathodes of rectifiers T6 and T3, respectively. Filter capacitors C1, C2 and C3 are connected between the control electrodes and cathodes of controlled rectifiers T1, T2 and T3, respectively.

Star connected transformer PT4, PT5 and PT6 supply phase-shifted voltages to the control electrodes of rectifiers T1, T2 and T3, respectively. To this end, the primary winding of transformer PT4 is connected between line L2 and a common point 16, the primary winding of transformer PT5 is connected between line L3 and point 16 and the primary winding of transformer PT6 is connected between line L1 and point 16.

Rectifier bridge 14 is provided with input terminals 18, 20 and 22 and positive and negative output terminals 24 and 26, respectively. Shunt field winding SF of the motor is connected in series with an adjustable shunt field resistor SFR across output terminals 24 and 26. The lower secondary windings of transformers PT1, PT2 and PT3 are connected between input terminals 18, 20 and 22, respectively, and a common point 28. There is provided in association with rectifier bridge 14 a circuit for supplying peaked voltages to the control electrodes of controlled rectifiers T1, T2 and T3. To this end, the input terminal end of the lower secondary winding of transformer PT1 is connected through a half-wave rectifier RT1 and the primary winding of a transformer PT7 to a common point 30. The input terminal end of the lower secondary winding of transformer PT2 is connected through a half-wave rectifier RT2 and the primary winding of a transformer PT8 to common point 30. The input terminal end of the lower secondary winding of transformer PT3 is connected through a half-wave rectifier RT3 and the primary winding of a transformer PT9 to common point 30. And a capacitor C4 and a resistor 1R are connected in parallel between common points 30 and 28. The lower secondary windings of transformers PT1 and PT2 are provided with center taps which are connected through conductors 32 and 34, respectively, for energizing a control network 36 hereinafter described.

A voltage divider comprising a pair of resistors 2R and 3R in series is connected across output terminals 24 and 26 of rectifier bridge 14. The junction of resistors 2R and 3R is connected in three branches: through the secondary winding of transformer PT9, the secondary winding of transformer PT4 and a resistor 4R to the control electrode of controlled rectifier T1; through the secondary windings of transformers PT7 and PT5 and a resistor 5R to the control electrode of rectifier T2; and through the secondary windings of transformers PT8 and PT6 and a resistor 6R to the control electrode of rectifier T3. A relatively large capacitor C5 is connected between the aforementioned junction of resistors 2R and 3R and the cathodes of controlled rectifiers T1-3. Output terminal 2 of rectifier network 6 is connected through a half-wave rectifier RT4 to positive output terminal 24 of rectifier bridge 14 for conduction in that direction to maintain the potential at output terminal 24 at or very near the potential of the cathodes of controlled rectifiers T1-3. A jog speed potentiometer JS, a speed control potentiometer SC and a maximum speed potentiometer MS are connected in series across output terminals 24 and 26 of rectifier bridge 14 and, thus, in parallel with voltage divider 2R-3R.

Control network 36 is provided with a normally open JOG switch, a forward switch FOR having normally open contacts 38 and 40, a reverse switch REV having normally open contacts 42 and 44 and a normally closed stop switch ST. These switches may be of the manual pushbutton type or the like. A timer TMR of the motor operated type or the like is provided with an electromagnetic operating coil connected through its normally closed timed opening contact TMR2 across conductors 32 and 34. Contact TMR2 is shunted by series connected resistor 7R and half-wave rectifier RT5 to protect the timer as hereinafter described. Network 36 is also provided a forward contactor F for controlling forward operation of the motor, a reverse contactor R for controlling reverse operation of the motor, a run control relay RCR operable from the forward and reverse switches but not from the jog switch, and a dynamic braking relay DB. The specific connections of these elements will become apparent when the circuits are traced in the description of operation hereinafter appearing.

Armature A of the motor is connectable in series with a series armature resistor SAR across output terminals 2 and 4 of rectifier network 6 through normally open contacts F1 and F2 of the aforementioned forward contactor F or through normally open contacts R1 and R2 of the aforementioned reverse contactor R in a well known manner. A dynamic braking resistor DBR is connectable across armature A through normally open contact DB1 of the aforementioned dynamic braking relay DB. The operating coil of an anti-plugging relay AP is connectable across armature A through normally open contact DB2 of dynamic braking relay DB. The operating coil of a current limit relay CLR is connected across resistor SAR.

Dynamic braking relay DB is further provided with a normally open contact DB3 and current limit relay CLR is provided with a normally open contact CLR1, these contacts being connected in parallel across the aforementioned rectifier RT4. Forward contactor F is additionally provided with a normally closed interlocking contact F3 in the energizing circuit of relay DB, a normally open maintaining contact F4 for shunting the forward and reverse switches, and a normally closed interlocking contact F5 in the energizing circuit of reverse contactor R. Reverse contactor R is additionally provided with a normally closed interlocking contact R3 in the energizing circuit of relay DB, a normally closed interlocking contact R4 in the energizing circuit of forward contactor F and a normally open maintaining contact R5 for shunting the forward and reverse switches. Relay RCR is provided with a normally open contact RCR1 in series with contact F4, a normally closed contact RCR2 for rendering speed control potentiometer SC ineffective during jogging, a normally open contact RCR3 for rendering potentiometer SC effective during running, a normally open maintaining contact RCR4 for shunting the forward and reverse switches and a normally open contact RCR5 in series with contact R5. Timer TMR is additionally provided with a timed closing contact TMR1 for preventing operation of the forward or reverse contactor until the thyratron rectifiers in network 6 have been afforded time to heat. Relay AP is provided with a normally closed contact AP1 to prevent plugging the motor.

A voltage divider comprising series connected resistors 8R and 9R is connected across armature A and resistor SAR. The junction of resistors 8R and 9R is connected through a resistor 10R where it divides; one branch extending through contact RCR2 to the junction of potentiometers JS and SC and the other branch extending through contact RCR3 to the movable arm of potentiometer SC. The movable arm of potentiometer JS is connected to the junction of potentiometers JS and SC, and the movable arm of potentiometer MS is connected to the junction of potentiometers SC and MS.

In Fig. 2(A), curves L1′, L2′ and L3′ depict the supply source voltages applied to the anodes of controlled rectifiers T1, T2 and T3, respectively. From these curves it will be apparent that line L1 is positive relative to line L2 during the 0–180 electrical degree period and hat line L1 is positive relative to line L3 during the 60–240 electrical degree period. The resultant voltage applied to the anode of rectifier T1 during the 0–240 electrical degree period is represented by curve ET1 in Fig. 2(B). The combined curve EL2–3 and EL2–1 in Fig. 2(B) represents the voltage applied to the anode of rectifier T2. For purposes of description of operation of rectifier T1 hereinafter appearing, the portion EL2–1 of the latter combined curve also represents the phase of the voltage applied through the lower secondary winding of transformer PT3 to the peaking pulse circuit for controlled rectifier T1. While the primary winding of transformer PT3 is connected from line L1 to line L2, it may be assumed that the lower secondary winding thereof is wound in the proper direction to obtain this phase relation for the peaking pulse circuit supply.

The remaining curves in Fig. 2(B) represent the grid characteristic or control locus CL of rectifier T1, the alternating current control electrode voltage CV, the direct current control voltage DC obtained from voltage divider 2R–3R, the voltage EC4 across capacitor C4 and the peaked pulse P for rectifier T1.

Referring to Fig. 3, there is shown a modification of the system of Fig. 1 whereby the alternating current control voltage CV and the peaked pulse P, Fig. 2(B), are applied to the control electrode of each controlled rectifier in parallel rather than in series as in Fig. 1. Reference characters like those in Fig. 1 are employed except for the added elements. Transformer PT9 which transmits the peaked pulse P has its secondary winding connected to the cathode and through a gating rectifier RT30 and resistor 4R to the control electrode of controlled rectifier T1. Transformer PT4 which transmits the alternating current control voltage CV has its secondary winding connected directly from the junction of resistors 2R and 3R through a resistor 30R and resistor 4R to the control electrode of controlled rectifier T1. While a similarly modified control circuit would also be provided for controlled rectifiers T2 and T3, the latter circuits have not been shown to avoid complicating the drawing. The two multiples adjacent the junction of resistors 2R and 3R represent similar connections to controlled rectifiers T2 and T3.

*Operation*

The operation of the system of Fig. 1 will now be described. Let it be assumed that power is supplied to lines L1, L2 and L3 from a three-phase power supply source. Thus, power is supplied through the primary windings and the upper and middle secondary windings of transformers PT1, PT2 and PT3 to the cathodes of the uncontrolled and controlled rectifiers to heat the same. Full-wave rectified power is supplied through the primary windings and lower secondary windings of transformers PT1, PT2, and PT3 and rectifier bridge 14 to energize shunt field winding SF of the motor. To this end, the star-connected lower secondary windings of transformers PT1, PT2 and PT3 supply input terminals 18, 20 and 22 of rectifier bridge 14 and output terminals 24 and 26 of the bridge supply unidirectional power to the shunt field winding.

A three-phase voltage is supplied to input terminals 8, 10 and 12 of network 6 and therethrough to the anodes of controlled rectifiers T1, T2 and T3. Therefore, the voltage applied from line L1 to the anode of controlled rectifier T1 will have a wave form as depicted by curve ET1 in Fig. 2(B) during the 0–240 electrical degree period. As will be apparent from Fig. 2(A) and (B), similar voltages are applied from line L2 to the anode of rectifier T2 during the 120–360 electrical degree period and from line L3 to the anode of rectifier T3 during the 240–480 electrical degree period for each complete three-phase cycle of the supply source.

Star-connected transformers PT4, PT5 and PT6 are connected to lines L2, L3 and L1, respectively, to provide control electrode voltages to rectifiers T1, T2, and T3 which are shifted in phase 90 degrees relative to their respective anode voltages. This is graphically shown Fig. 2. It will be apparent from Fig. 2(A) and (B) that, at the 150 electrical degree point, when line L1, which is connected to the anode of rectifier T1, is maximum positive relative to line L3, line L2 is at zero potential which is increasing. Therefore, connection of transformer PT4 to line L2 affords a control electrode voltage to rectifier T1 which lags the line L1–L3 anode voltage of rectifier T1 by 90 degrees as depicted by curve CV in Fig. 2(B). Similarly, rectifiers T2 and T3 are provided with control electrode voltages lagging their respective anode voltages by 90 degrees by connection of transformer PT5 to line L3 and connection of transformer PT6 to line L1. The effect of these phase-shifted control electrode voltages will hereinafter be more fully described.

Alternating current power is also supplied from the center taps on the lower secondary windings of transformers PT1 and PT2 through conductors 32 and 34 to energize control network 36. As a result, timer TMR is energized in a circuit extending through its operating coil and contacts TMR2 and starts to time the closure of contacts TMR1 and opening of contacts TMR2. The timing interval of timer TMR may be adjusted to afford sufficient time for the rectifiers in network 6 to heat before contacts TMR1 close to permit operation of the motor.

Power is further supplied to the peaking circuit from the lower secondary winding of transformer PT1 through rectifier RT1, the primary winding of transformer PT7, point 30, capacitor C4 and resistor 1R in parallel and point 28 back to the last mentioned secondary winding; from the lower secondary winding of transformer PT2 through rectifier RT2, the primary winding of transformer PT8, point 30, capacitor C4 and resistor 1R in parallel and point 28 back to the last mentioned secondary winding; and from the lower secondary winding of transformer PT3 through rectifier RT3, the primary winding of transformer PT9, point 30, capacitor C4 and resistor 1R in parallel and point 28 back to the last mentioned secondary winding. This peaking circuit extending through the primary windings of transformers PT7, PT8 and PT9 provides steep wave front control pulses to the control electrodes of controlled rectifiers T1, T2 and T3 in a predetermined phase sequence relative to the phases of the anode voltages thereof as depicted by pulse P in Fig. 2(B).

The system of Fig. 1 operates as hereinafter described. It will be recalled that shunt field winding SF has been energized. To run the motor in the forward direction, forward switch FOR is pressed to close contacts 38 and 40. Let it be assumed that timer TMR has timed out to close contact TMR1 and open contact TMR2. Contact TMR1 closes a point in the energizing circuits of contactors F and R and relay RCR. Contact TMR2 interrupts the original alternating current energizing circuit of timer TMR. Thereafter timer TMR is maintained by the half-wave rectified pulses flowing through rectifier RT5 and resistor 7R. This reduction in energization of the timer motor prevents forcing of the gearing thereof yet maintains contacts TMR1 closed and contacts TMR2 open.

Closure of contact 38 effects energization of forward contactor F in a circuit extending from conductor 34 through contact R4, its operating coil, contacts 38, AP1 and TMR1 and stop switch ST to conductor 32. Closure of contact 40 effects energization of relay RCR in a circuit extending through its operating coil, contacts 40, AP1 and TMR1 and stop switch ST. Contactor F closes contacts F1 and F2 to connect armature A of the motor in series with resistor SAR across output terminals 2 and 4 of network 6. Contact F3 interrupts the energizing circuit of dynamic braking relay DB, contact F4 closes a point in a maintaining circuit for contactor F and contact F5 opens to prevent concurrent energization of reverse contactor R.

Relay RCR closes contact RCR1 to complete the maintaining circuit of contactor F in shunt of contacts 38 and AP1, opens contact RCR2 and closes contact RCR3 to render speed control potentiometer SC effective, closes contact RCR4 to complete a maintaining circuit for its operating coil through contact TMR1 and stop switch ST, and closes contact RCR5 without effect at this time.

The three-phase alternating voltage applied from the lower secondary windings of transformers PT1, PT2 and PT3 to input terminals 18, 20 and 22 of rectifier bridge 14 is rectified in the latter and applied from the positive and negative output terminals 24 and 26 thereof across voltage divider 2R–3R and also in parallel with the latter across potentiometers JS, SC and MS. An adjustable portion of this unidirectional voltage is applied from the junction of resistors 2R and 3R to the control electrodes of controlled rectifiers T1, T2 and T3 in parallel. These circuits may be traced through the secondary windings of transformers PT9 and PT4 and resistor 4R to rectifier T1; through the secondary windings of transformers PT7 and PT5 and resistor 5R to rectifier T2; and through the secondary windings of transformers PT8 and PT6 and resistor 6R to rectifier T3.

The amount of conduction of controlled rectifiers T1, T2 and T3 and thus the armature voltage is preselected and controlled by adjustment of the movable arm of speed control potentiometer SC. As the movable arm is moved from the upper positive end of its associated resistor toward the lower negative end as shown by the arrow, the unidirectional control voltage, shown as line DC in Fig. 2(B), applied between the control electrodes and cathodes of the controlled rectifiers is increased to a value where the latter conduct. To this end, the phase-displaced alternating control voltage CV applied to the control electrodes from transformers PT4, PT5 and PT6 and which is superimposed on the undirectional voltage intersects the grid characteristic CL to render the controlled rectifiers conducting. A relatively large capacitor C5 is provided to time the rise of voltage on the aforementioned control electrodes so that the voltage rises gradually rather than rising instantaneously. This is desirable to prevent excessive output current to the motor armature during the transient period in the event the movable arm of potentiometer SC is quickly moved from the positive end all the way to the negative end, which might occur in the absence of capacitor C5.

The voltage divider comprising resistors 8R and 9R connected across the armature provides automatic feedback control of the armature voltage. As the motor speed increases, a unidirectional voltage is developed across resistors 8R and 9R. A predetermined portion of this voltage is applied from the junction of these resistors through resistor 10R and contact RCR3 and compared with the unidirectional reference voltage appearing at the movable arm of potentiometer SC. The difference between the first mentioned unidirectional voltage which is indicative of actual motor speed and the reference voltage is applied from the junction of resistors 2R and 3R to the control electrodes of controlled rectifiers T1, T2 and T3 to control the latter, thus tending to maintain the speed of the motor constant at the preselected value.

The minimum speed of the motor as well as the jog speed thereof is set at potentiometer JS. Movement of the movable arm of potentiometer JS in the counterclockwise direction as shown by the arrow increases the control electrode to cathode voltage to increase the minimum speed of the motor. Conversely, adjustment of potentiometer JS in the other direction decreases the minimum speed.

The maximum speed of the motor is set at potentiometer MS. Let it be assumed that the movable arm of potentiometer MS is turned all the way counterclockwise to effectively shunt the resistance thereof. It will be apparent that, as a result, full range of speed control is afforded at potentiometer SC all the way from the minimum speed set at potentiometer JS to maximum motor speed. When the movable arm of potentiometer MS is turned back in the clockwise direction a desired amount to effectively insert resistance in the circuit, the maximum speed that can be obtained by adjustment of potentiometer SC is correspondingly changed. Thus, the minimum and maximum motor speeds may be set and the speed adjusted at potentiometer SC between these limits as desired.

The function of current limit relay CLR is to limit the armature current to a safe value. Should the armature current increase above a predetermined safe value, relay CLR responds and closes contact CLR1. Closure of contact CLR1 connects the voltage appearing at output terminal 24 of rectifier bridge 14 to the cathodes of controlled rectifiers T1, T2 and T3, thereby to initiate discharge of capacitor C5 and driving of the control electrode voltage toward negative relative to the cathode voltage thereof. As a result, the firing point of the controlled rectifiers is retarded and consequently the armature current decreased. This action is so rapid that relay CLR energizes only momentarily to bring the armature current back to a safe value.

To prevent uncontrolled conduction of controlled rectifier T1, T2 or T3 and to insure commutation of the armature current thereby in a predetermined sequence, the aforementioned peaking pulse circuit is provided. Rectifiers RT1, RT2 and RT3, transformers PT7, PT8 and PT9 and capacitor C4 develop steep wave front pulses which are applied to the control electrodes of controlled rectifiers T1, T2 and T3 to force the latter to fire in their proper sequence. This is graphically shown for rectifier T1 in Fig. 2(B). If rectifier T1 fires normally at the point of intersection of curve CV with curve CL ahead of pulse P, the latter of course has no effect. However, should rectifier T1 fail to fire in its sequence in response to control voltage CV, pulse P forces the same to fire and maintain commutation of the armature current. Resistor 1R connected across capacitor C4 determines the phase angle of pulse P relative to anode voltage ET1. It may be assumed that resistor 1R is given a value so that pulse P forces the controlled rectifier to fire during the last 15 degrees of its normal conduction period or, in other words, during the last 15 degrees of the anode voltage wave ET1.

In Fig. 2(B), wave EC4 represents the voltage across capacitor C4. It will be apparent from wave EC4 that capacitor C4 alternately charges and discharges in response to the half-wave rectified voltages applied thereto from the lower secondary windings of transformers PT1, PT2 and PT3 through the associated half-wave rectifiers RT1, RT2 and RT3. To provide pulse P during the last 15 degrees of anode voltage ET1, capacitor C4 is caused to charge in response to a rectified half-cycle which is in phase with the line L2-to-line L1 voltage EL2–1 as shown in Fig. 2(B). To this end, such rectified half-cycle is derived from the lower secondary winding of transformer PT3 having its primary winding connected from line L1 to line L2. It will be apparent that just prior to pulse P, capacitor C4 is discharging as depicted by the downward slope of wave EC4. When the rectified half-cycle voltage applied across the primary winding of transformer PT9 and capacitor C4 exceeds the discharge voltage of the latter, a pulse of current flows through the primary winding of transformer PT9 to recharge capacitor C4. The current flowing through the primary winding of transformer PT9 develops an amplified voltage pulse P in the secondary winding thereof which is applied through the secondary winding of transformer PT4 and resistor 4R to the control electrode of controlled rectifier T1. Similar pulses are applied from transformers PT7 and PT8 to the control electrodes of controlled rectifiers T2 and T3, respectively.

Half-wave rectifier RT4 is connected from the cathodes of controlled rectifiers T1, T2 and T3 to positive output terminal 24 of rectifier bridge 14 to conduct in that direction and to block in the opposite direction. As a result, rectifier RT4 prevents output terminal 24 from going more than approximately a volt negative relative to the cathodes of the controlled rectifiers. If output terminal 24 was allowed to go negative relative to such cathodes a substantial amount, pulse P would be rendered ineffective unless the amplitude thereof was significantly increased. Thus, the function of rectifier RT4 is to maintain uniform effectiveness of the peaking pulses.

To stop the motor, stop switch ST is momentarily pressed to open the same and to interrupt the maintaining circuit of contactor F. Contacts F1 and F2 disconnect power from armature A and contact F4 further interrupts its maintaining circuit whereafter the stop switch may be released. Contact F5 closes without effect and contact F3 effects energization of dynamic braking relay DB through contact R3. Contact DB1 connects dynamic braking resistor DBR across armature A to brake the motor. Contact DB3 closes to drive controlled rectifiers T1, T2 and T3 to cut-off and contact DB2 connects relay AP across armature A.

The function of anti-plugging relay AP is to prevent restarting or reverse energization of the motor after the stop switch is pressed until the armature voltage has decreased to a low value. If either the forward switch or reverse switch were pressed immediately after operation of the stop switch, to call for operation of the motor in the opposite direction, the output voltage of rectifier network 6 and the counter voltage of the motor would be additive with only the armature resistance to limit the current; hence, the armature current would rise to excessively high values whereby to damage both motor and controller. To prevent this, relay AP responds under such reversing conditions to open contact AP1 in circuit with the operating coils of the forward and reverse contactors to prevent reoperation of the motor.

The motor may be operated in the reverse direction by pressing reverse switch REV momentarily. As a result, contactor R and relay RCR are energized and the operation of control network 36 is similar to that described in connection with forward operation except that armature A is energized in the reverse direction. Contactor R is provided with maintaining, interlocking and dynamic braking contacts corresponding to those of contactor F to effect stopping of the motor as aforedescribed.

To jog the motor in the forward direction, switch JOG is pressed to complete an energizing circuit for forward contactor F therethrough and through contacts R4, AP1 and TMR1 and stop switch ST. As a result, contactor F energizes the motor in the forward direction to operate as hereinbefore described. Relay RCR does not energize during jogging. As contact RCR3 remains open, speed control potentiometer SC is ineffective. Contact RCR2 remains closed to afford feedback from armature A to maintain the jogging speed as set on potentiometer JS. Thus, the motor runs at a slow jogging speed in the forward direction as long as switch JOG is maintained closed.

The modified system shown in Fig. 3 operates in essentially the same manner as the system of Fig. 1. In Fig. 3, control electrode voltage CV graphically indicated in Fig. 2(B) is applied to controlled rectifier T1 through transformer PT4 and resistors 30R and 4R. Peaking pulse P is applied through transformer PT9, rectifier RT30 and resistor 4R to the control electrode. It will be apparent that these control signals are applied in parallel to the control electrode rather than in series as in Fig. 1. Gating rectifier RT30 is connected from the secondary winding of transformer PT9 to the junction of resistors 30R and 4R in the control electrode circuit. As a result, when the alternating control electrode voltage CV normally fires the controlled rectifier, the voltage appearing at the junction of resistors 30R and 4R prevents rectifier RT30 from conducting thereby to block the peaking pulse. To this end, resistor 4R has a significantly higher value than resistor 30R of the order of 1,000 to 1. In the event control electrode voltage CV fails to render the controlled rectifier conducting in its normal sequence, rectifier RT30 is not blocked and pulse P is transmitted therethrough and through resistor 4R to fire controlled rectifier T1.

I claim:

1. In a system for transferring electrical energy between an alternating current source and a direct current load having a plural-path rectifier network for full-wave transfer of energy from said source to said load and comprising a first group of controllable unidirectional conducting devices connected between said source and said load and a second group of uncontrollable unidirectional conducting devices connected between said load and said source, each of said paths including the load and one unidirectional conducting device of each of said groups, the improvement comprising means for controlling conduction in said paths in repetitively sequential cycles and for preventing uncontrolled conduction of said unidirectional conducting devices, said controlling means comprising means for applying to each controllable conducting device an alternating current control voltage having a phase displacement relative to the phase of its main electrode voltage for normally rendering the controllable devices conducting in said sequence, and means for applying to each controllable conducting device a steep wave front pulse during the latter portion of its normal conducting period to insure commutation of the load current thereby in said sequence.

2. The invention defined in claim 1, wherein the last mentioned means comprises a peaking circuit energized from the alternating current source for applying said pulse to each controllable conducting device in series with said means for applying an alternating current control voltage thereto.

3. The invention defined in claim 2, wherein said peaking circuit comprises a rectifier for deriving a rectified half-cycle from the alternating current source during the latter portion of the normal conduction period of each controllable conducting device, a capacitor in circuit with said rectifier for charging in response to said rectified half-cycle, a discharge circuit for said capacitor, and a transformer in said circuit for transmitting a peaked pulse to the associated controllable conducting device.

4. The invention defined in claim 3, wherein said discharge circuit comprises a resistor connected across said capacitor, the value of said resistor relative to the value of said capacitor determining the phase angle of said pulse relative to the normal conduction period of the associated controllable conducting device.

5. The invention defined in claim 1, wherein the last mentioned means comprises peaking means energized from the alternating current source for producing a steep wave front pulse, and means for connecting said peaking means to each controllable conducting device in parallel with said means for applying an alternating control voltage thereto.

6. The invention defined in claim 5, wherein said peaking means comprises a rectifier for deriving a rectified half-cycle from the alternating current source during the latter portion of the normal conduction period of each controllable conducting device, a capacitor in circuit with said rectifier for charging in response to said rectified half-cycle, a discharge circuit for said capacitor, and a transformer in said circuit for transmitting an amplified steep wave front pulse to the associated controllable conducting device, the output of said transformer being connected to said controllable conducting device at the junction thereof with said means for applying an alternating control voltage thereto.

7. The invention defined in claim 6, together with a gating device connecting the output of said transformer to said junction, said gating device being responsive to said alternating control voltage when the latter normally renders said controllable device conducting in its normal sequence to render said pulse ineffective, and said gating device being effective to transmit said pulse when said alternating control voltage fails to render said controllable device conducting.

8. The invention defined in claim 1, together with a unidirectional voltage source, means for applying to each controllable conducting device from said source a unidirectional control voltage having said alternating control voltage superimposed thereon, and means for preventing the voltage of said unidirectional source from shifting negative relative to the cathode voltage of said controllable conducting devices.

9. The invention defined in claim 8, wherein the last mentioned means comprises a unidirectional conducting device connected between the cathodes of said controllable devices and said unidirectional voltage source.

10. In a rectification network, in combination, a plurality of controllable electric discharge devices connected between a plural-phase alternating current source and a direct current load, each of said devices having an anode and a cathode and a control electrode, said anodes being connected to different phases of said source and said cathodes being connected to said load, means for applying an alternating current control voltage to the control electrode of each said device having a predetermined phase displacement relative to the anode voltage of the corresponding device to control the firing of said devices in a repetitive sequence, a full-wave rectifier bridge for deriving a unidirectional control voltage from said source, adjustable means for applying said unidirectional control voltage having said alternating control voltage superimposed thereon to the control electrode of each device to control conduction in the latter, and a peaking network connected to said bridge for applying a steep wave front pulse to the control electrode of each device during approximately the last fifteen degrees of the normal conduction cycle of the corresponding device.

11. The invention defined in claim 10, together with a unidirectional conducting device connecting the cathodes of said electric discharge devices to the output of said rectifier bridge to prevent the voltage of the latter from changing significantly negative relative to the voltage at the cathode of said devices.

12. In a motor control system having a full-wave rectifier network connecting a plural-phase alternating current source to the armature of the motor, said network comprising a plurality of electric discharge devices each having an anode and a cathode in said armature connection and a control electrode, a full-wave rectifier network having positive and negative output terminals connected across the field winding of the motor, and translating means for supplying said rectifier bridge from said source, in combination, adjustable means for applying a unidirectional voltage from said rectifier bridge to said control electrodes, means for applying from said source alternating voltage waves to said control electrodes, each said voltage wave having a predetermined phase displacement relative to the anode voltage of the corresponding electric discharge device, adjustment of said adjustable means rendering said electric discharge devices variably conducting in a predetermined sequence to adjust the speed of the motor, and peaking means connected to said translating means for applying to said control electrode of each electric discharge device a steep wave front pulse during the extreme latter portion of its normal conduction cycle to insure commutation of the armature current thereby in the event said device fails to respond to said alternating control voltage.

13. The invention defined in claim 12, wherein said peaking means comprises a half-wave rectifier and a transformer and a capacitor for developing said pulse, and a resistor associated with said capacitor, the value of said resistor being determinative of the phase relation of said pulse to the phase of the anode voltage of the corresponding electric discharge device.

14. The invention defined in claim 13, together with means for preventing the voltage at the positive output terminal of said rectifier bridge from changing significantly negative relative to the cathode voltage of said electric discharge devices whereby said pulses are maintained effective to control commutation of the armature current in said devices.

15. The invention defined in claim 12, wherein said steep wave front pulse has a predetermined fixed phase angle relative to the normal conduction period of the associated electric discharge device.

No references cited.